US009388887B2

(12) United States Patent
Li (10) Patent No.: US 9,388,887 B2
(45) Date of Patent: Jul. 12, 2016

(54) CAM MECHANISM

(75) Inventor: Ming Li, Singapore (SG)

(73) Assignee: RAZER (ASIA-PACIFIC) PTE LTD., Singapore (SG)

( * ) Notice: Subject to any disclaimer, the term of this patent is extended or adjusted under 35 U.S.C. 154(b) by 132 days.

(21) Appl. No.: 14/112,066

(22) PCT Filed: Apr. 29, 2011

(86) PCT No.: PCT/SG2011/000166
§ 371 (c)(1),
(2), (4) Date: Feb. 19, 2014

(87) PCT Pub. No.: WO2012/148354
PCT Pub. Date: Nov. 1, 2012

(65) Prior Publication Data
US 2014/0174249 A1  Jun. 26, 2014

(51) Int. Cl.
*F16H 53/00* (2006.01)
*F16H 25/12* (2006.01)
*F16H 25/18* (2006.01)

(52) U.S. Cl.
CPC ............. *F16H 25/12* (2013.01); *F16H 25/186* (2013.01); *Y10T 74/2107* (2015.01)

(58) Field of Classification Search
CPC ......... F16H 53/06; F16H 25/12; F16H 25/00; F16H 25/186; G03B 3/00; G05D 3/12; G02B 7/04; G02B 15/14; G02D 7/08; Y10T 74/2107
USPC .......................... 74/567, 568 R, 569; 53/272
See application file for complete search history.

(56) References Cited

U.S. PATENT DOCUMENTS

| 5,667,283 | A  | * | 9/1997  | Drennen et al. ............ 303/115.2 |
| 6,134,053 | A  |   | 10/2000 | Kabe et al. |
| 6,822,810 | B2 | * | 11/2004 | Ichino ..................... G02B 15/14 |
|           |    |   |         | 359/696 |

(Continued)

FOREIGN PATENT DOCUMENTS

CN     1351234 A    5/2002
CN   101281341 A   10/2008

(Continued)

OTHER PUBLICATIONS

International Search Report mailed Feb. 6, 2012 in International Application No. PCT/SG2011/000166.

(Continued)

*Primary Examiner* — Adam D Rogers
(74) *Attorney, Agent, or Firm* — Polsinelli PC (57) ABSTRACT

A novel cam mechanism or assembly is provided by the present disclosure. The cam mechanism can have a cylindrical or barrel shape configuration. The cam mechanism includes a first module or body (also referred to as an inner body), a cam module or body encircling said first module, and a guide module or body (also referred to as an outer body) encircling each of the first module and the cam module. The cam mechanism is configured to translate rotary motion or torque of the cam module about a rotational axis (A) into linear displacement of the first module in a parallel manner along said rotational axis (A). The outer body or guide body encircles each of the cam module and the inner body. The outer body can be a stationary or fixed structure, and can be configured to physically isolate the movable components of the cam mechanism (e.g., the cam module and the inner body).

26 Claims, 5 Drawing Sheets

(56) References Cited

U.S. PATENT DOCUMENTS

| | | | |
|---|---|---|---|
| 7,039,308 B2 * | 5/2006 | Nomura | 396/72 |
| 8,339,504 B2 * | 12/2012 | Uehara | G02B 7/08 348/335 |
| 8,810,920 B2 * | 8/2014 | Iwasaki | G02B 7/08 359/700 |
| 8,919,223 B2 * | 12/2014 | Corniani | 74/568 R |
| 8,976,461 B2 * | 3/2015 | Koga | G02B 7/102 359/694 |
| 2002/0092371 A1 | 7/2002 | Nakakado | |
| 2009/0002847 A1 * | 1/2009 | Nakada | G02B 7/102 359/702 |

FOREIGN PATENT DOCUMENTS

| | | | |
|---|---|---|---|
| JP | 55050201 A | * | 4/1980 |
| JP | 61-018908 A | | 1/1986 |
| JP | 2010-276793 A | | 12/2010 |

OTHER PUBLICATIONS

First Office Action mailed Oct. 19, 2015 in Chinese Patent Application No. 201180070523.8.

* cited by examiner

CAM MECHANISM

TECHNICAL FIELD

The present disclosure relates generally to a motion transforming apparatus, more specifically a cam mechanism or apparatus, that is configured to transform a rotary motion or torque of one body, module, or component into a linear motion of another body, module, or component.

BACKGROUND

Cam mechanisms or apparatuses have been conventionally used for transforming rotary motion or torque into linear motion, or vice versa. Cam mechanisms are generally considered to be versatile tools for utilizing, transforming, or manipulating motions.

Cam mechanisms have been widely used across numerous industries. Conventionally, cam mechanisms have an important function in the operation of a broad range of automatic-type machines, for example printing machinery, textile machinery, and screw machines. A common example of a cam mechanism can be seen with the camshaft of an automobile, wherein rotary motion of the engine is translated into linear motion for operating the intake and exhaust cylinder valves.

Existing cam mechanisms have different structural configurations. A cam mechanism typically include a cam (or cam module or body), which can be defined as a rotating or sliding element in a mechanical linkage used for transforming rotary motion into linear motion, or vice versa. A cam mechanism also typically includes an input shaft or body connected with a driver or driving means (e.g., a motor) and an output shaft or body connected or coupled to a driven element. The driver drives rotation of the input shaft connected thereto. The rotation of the input shaft is converted into linear motion of the output shaft or body by way of a cam (or cam module or body).

Many existing cam mechanisms applied or used with mechanical devices, for instance cameras, have the input shaft positioned as an outermost component. Rotation of the input shaft is effectuated by a user. This user-effectuated rotation of the input shaft enables adjustment or varying of lens focus. However, cam mechanisms with the input shaft or body positioned as the outermost component are often not suitable for compact structures. Accordingly, it will be appreciated that modifications, improvements, and/or enhancements to existing cam mechanisms are required.

SUMMARY

In accordance with a first aspect of the present disclosure, there is disclosed an assembly that includes a first body with at least one follower element and an outer body defining an axis. The outer body includes at least one guide structure configured to engage with the at least one follower element for confining travel thereof to at least substantially parallel to the axis and guiding the first body between a first position and a second position. The assembly also includes a cam module positioned between the first body and the outer body, the cam module configured with the outer body for rotational displacement at least substantially about the axis. The cam module defines at least one pathway having a profile, the at least one pathway being shaped and dimensioned for travel of the at least one follower element therealong during rotational displacement of the cam module about the axis. Travel of the at least one follower element along the at least one pathway during rotational displacement of the cam module linearly displaced the at least one follower element along the at least one guide structure and parallel the axis to thereby displace the first body between the first position and the second position. The assembly can further include a driver coupled to the cam module, a control module coupled to the driver and an auto-locking feature coupled to the control module. The driver can be operable to effectuate rotation of the cam module about the axis. The control module can be configured to control operation of the driver. The auto-locking feature can be configured to maintain a relative position of each of the first body, the cam module and the outer body. The auto-locking feature can include a worm gear configured to control rotation of the cam module.

In accordance with a second aspect of the present disclosure, there is disclosed a method for translating rotary torque into linear motion. The method includes operating a driver coupled to a cam module of a cam assembly to rotate the cam module about an axis. The cam module defines at least one pathway having a profile, the at least one pathway shaped and dimensioned for allowing travel of at least one follower element of a first body of the cam assembly therealong during rotation of the cam module about the axis. The cam assembly further comprises an outer body encircling each of the cam module and the first body, the outer body including at least one guide structure configured to engage with the at least one follower element for confining travel thereof to substantially parallel the axis and guiding positioning of the first body between a first position and a second position. The method also includes linearly displacing the at least one follower element along at least one guide structure during rotation of the cam module about the axis to thereby displace the first body the first body between the first position and the second position.

BRIEF DESCRIPTION OF THE DRAWINGS

Description of various embodiments of the present disclosure is provided with reference to the figures, in which.

DETAILED DESCRIPTION

Many embodiments of the present disclosure provide a motion transforming or translating apparatus, more specifically a cam mechanism, assembly, apparatus, system, device, and/or structure, for transforming rotary motion or torque of one element, module, component, or body (e.g., a cam module) into linear motion of another element, module, component, or body. Methods, processes, and/or techniques for transforming rotary motion of one element, module, component, or body into linear motion of another element, module, component, or body by using, applying, or incorporating the cam mechanism, apparatus, system, device, and/or structure of the present disclosure are also covered within the scope of the present disclosure.

The cam mechanism or apparatus of many embodiments of the present disclosure enables smooth, accurate, effective, and/or efficient transfer or translation of rotary motion or torque (e.g., rotary motion of one element about a rotational axis) into linear motion (e.g., linear motion of another element in a parallel manner along said rotational axis).

In many embodiments of the present disclosure, the cam mechanism or apparatus includes a first body, module, or element (also referred to as an inner body, module, or element or an up/down body, module, or element); a cam body or module; and an outer body, module, or element (also referred to as a guide body, module, or element or an outer body, module, or element).

In most embodiments, the cam module is configured to surround, encircle, or encapsulate the first body. In addition, the outer body is configured to surround, encircle, or encapsulate the cam module. Accordingly, the cam module is positioned or disposed between the outer body and the first body. In several embodiments, the outer body, the cam module, and the first body are concentrically aligned. The outer body of the cam mechanism or apparatus can be a stationary or fixed body. Keeping said outer body stationary can enable or facilitate easier, faster, more accurate, and/or more durable mounting or coupling of other component(s), element(s), structure(s), or part(s) to the outer body of the cam mechanism or assembly.

The first body includes at least one follower element. The cam module defines, includes, or carries at least one pathway, and in many embodiments a plurality of pathways, (which can be referred to as a set of pathways). Each pathway of the set of pathways has a predetermined profile and is shaped and dimensioned to allow travel of the at least one follower element therealong. The outer body or guide body includes or carries at least one follower element guide structures, and in many embodiments a plurality of follower element guide structures, (which can be referred to as a set of follower element guide structures). Each follower element guide structure is configured to engage with a corresponding follower element for guiding, controlling, limiting, and/or determining displacement of said follower elements. In many embodiments, the set of follower elements is configured to confine, determine, limit, or control an effective direction of travel or displacement of the set of follower elements.

The cam module can be rotated about a rotational axis. Said rotation of the cam module can be driven or effectuated by a motor or driver. The rotation of the cam module about the rotational axis can be controlled, for instance using a control module 310 coupled to the driver. For instance, at least one of initiation, termination, and/or speed of rotation of the cam module about the rotational axis can be controlled and/or varied as desired.

The rotation (i.e., rotational displacement) of the cam module about the rotational axis causes travel or displacement of the set of follower elements along the set of pathways of the cam module. The set of follower element guide structures confines travel, or effective displacement or travel, of the set of follower elements to substantially parallel the rotational axis. Therefore, displacement of the set of follower elements of the first body along the set of pathways during rotational displacement of the cam module effectuates, or results in, linear displacement of the first body parallel the rotational axis to thereby displace the first body between a first and a second position.

Representative aspects of cam assemblies or mechanisms provided by the present disclosure as well as representative aspects of processes or methods for translating rotary motion or torque to linear motion using said cam assembly or mechanism are described in detail hereinafter with reference to FIG. 1 to FIG. 4, in which like or analogous elements or process portions are shown numbered with like or analogous reference numerals. Relative to descriptive material corresponding to one or more of FIGS. 1 to 4, the recitation of a given reference numeral can indicate simultaneous consideration of a FIG. in which such reference numeral was previously shown. The embodiments provided by the present disclosure are not precluded from applications in which particular fundamental structural and/or operational principles present among the various embodiments described herein are desired.

Aspects of the Cam Assembly or Mechanism

FIG. 1 to FIG. 3D show various aspects of a cam assembly or mechanism 20 according to particular embodiments of the present disclosure.

The cam mechanism 20 includes a first body 50 (also referred to as an inner body, an up/down body, or a linearly displaceable body); a cam module, body, or element 100; and an outer body 150 (also referred to as a guide body or a second body).

The cam mechanism 20 can be constructed to be of a compact design. In addition, the cam mechanism 20 can be constructed to achieve or provide a target or an intended load capacity. The cam mechanism 20 can be applied, incorporated, or used with many existing devices (e.g., mechanical devices). For instance, the cam mechanism 20 can be incorporated into, or used with, a speaker device, apparatus, mechanism, or module. The cam mechanism 20 incorporated into a speaker device can enable the rotary motion of one component (e.g., the cam module 100) to effectuate a linear vertical (i.e., up/down) movement of a component, part, or element of the speaker device. Said component, part, or element of the speaker device can be coupled to or carried by the first body 50.

In most embodiments, the cam module 100 surrounds, encircles, or encapsulates the first body 50; and the outer body 150 surrounds, encircles, or encapsulates the cam module 100, and accordingly the first body 50. In most embodiments, the cam mechanism 20 is configured or assembled such that the cam module 100, or at least a substantial portion of the cam module 100, is disposed or positioned between the first body 50 and the outer body 150. In several embodiments, the outer body 150, the cam module 100, and the first body 50 are concentrically aligned.

The cam mechanism 20 can have a cylindrical or barrel-shape structure or configuration. Each of the cam module 100, the first body 50 or inner body 50, and the outer body 150 or guide body 150 (or at least a portion of each of the cam module 100, the first body 50, and the outer body 150) can be, or can include, a cylindrical or barrel-shape structure. It will be understood that the cam mechanism 20 or at least one of the cam mechanism's component parts (e.g., at least one of the cam module 100, the first body 50, and the outer body 150), can alternatively be shaped and/or configured differently, for instance in a oval, square, rectangular, elliptical, or other irregular shape. The cam mechanism may be coupled to a sound component 502. The cam mechanism may be mounted onto, or above, the sound component 502.

Various Aspects of the First Body/Inner Body

Figure 3A:
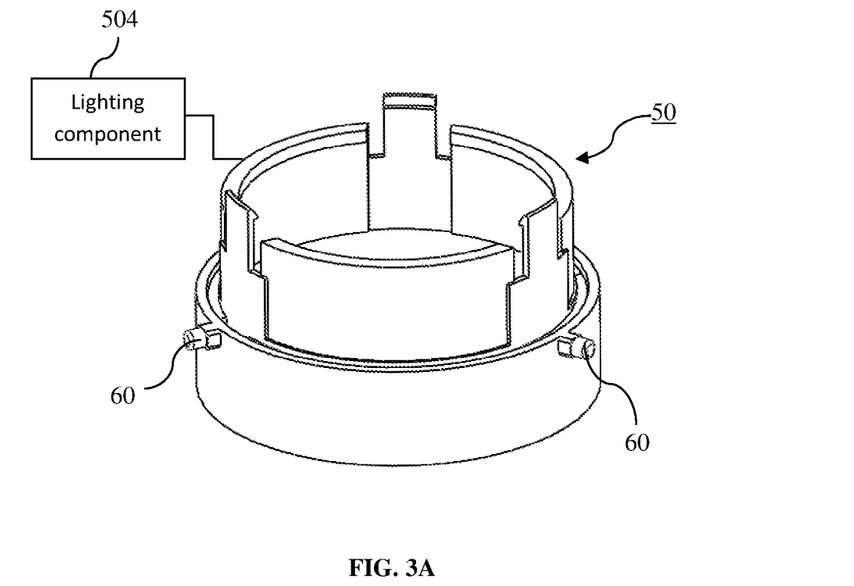
FIG. 3A to FIG. 3D show different components or elements of the cam assembly of FIG. 1 accordingly to particular embodiments of the present disclosure.

In many embodiments, the first body 50 (also referred to as the inner body 50 or the up/down body 50) is a cylindrical structure defining a hollow interior or space. FIG. 3A shows the first body 50 according to particular embodiments of the present disclosure.

Figure 1:
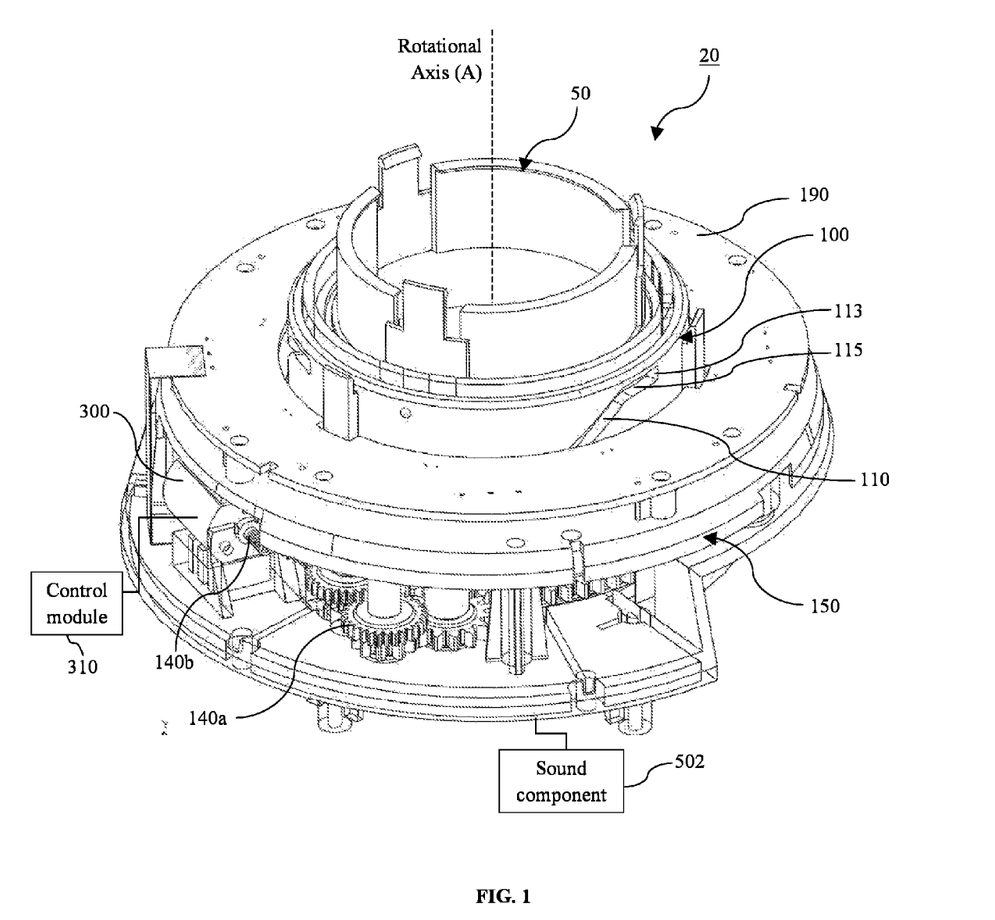
FIG. 1 shows illustrates a cam assembly or mechanism according to an embodiment of the present disclosure.
Figure 2:
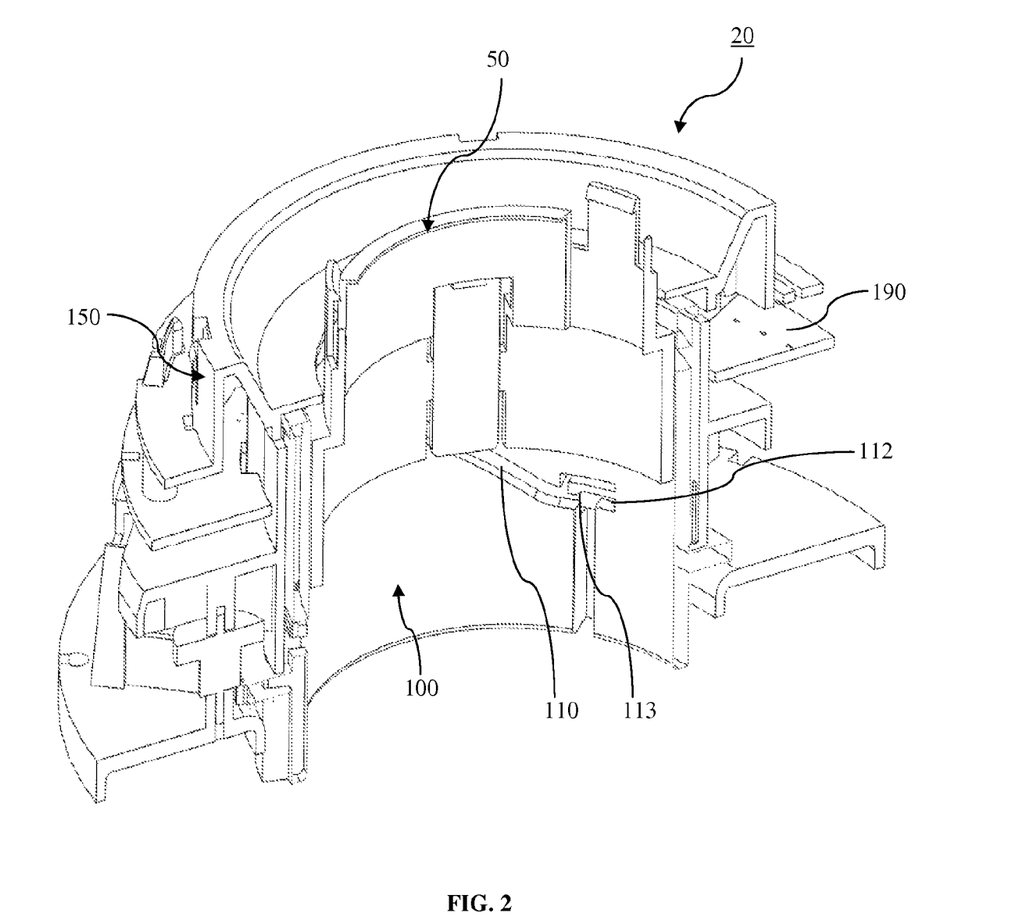
FIG. 2 shows a partial cross-sectional view of the cam assembly of FIG. 1.

The first body 50 can be displaced in a linear manner, more specifically in a straight line parallel a rotational axis (A) as defined by the first body (see FIG. 1 and FIG. 3A). The linear displacement of the first body 50 parallel the rotational axis (A) can be controlled, defined, or determined by the outer body 150, more specifically by a set of guide structures 160 of the outer body 150, in a manner that is described below.

In many embodiments, the first body 50 includes a number of follower elements or tabs 60 (i.e., a set of follower elements 60). The follower element(s) 60 can be disposed or positioned at or along an outer circumference of the first body 50. More specifically, the follower element(s) 60, or at least a part of the follower element(s) 60, can project or extend a distance from the outer circumference of the first body 50.

The number of follower elements 60 carried by the first body 50 can be varied or adjusted as required, for instance depending upon a size and/or weight of the first body 50 and/or a load supported or carried by the first body 50.

In particular embodiments, for instance as shown in FIG. 3A, the first body 50 can include three follower elements 60 projecting from the outer circumference of the first body 50. Each of the three follower elements 60 can be positioned for enabling even distribution of the weight of the first body 50, for instance when the first body 50 is coupled or mounted to the cam module 100. For example, where the first body 50 is cylindrical in shape, the three follower elements 60 can project from the outer circumference of the first body 50 at a 120° angle relative to each other. Where the first body 50 has a different shape, the number and relative position of the follower elements 60 of said first body 50 of a different shape can be adjusted as required or desired, for instance to enable even or balanced distribution of weight of said first body 50. The first body 50 may carry alighting component 504.

Various Aspects of the Cam Module

Figure 3B:
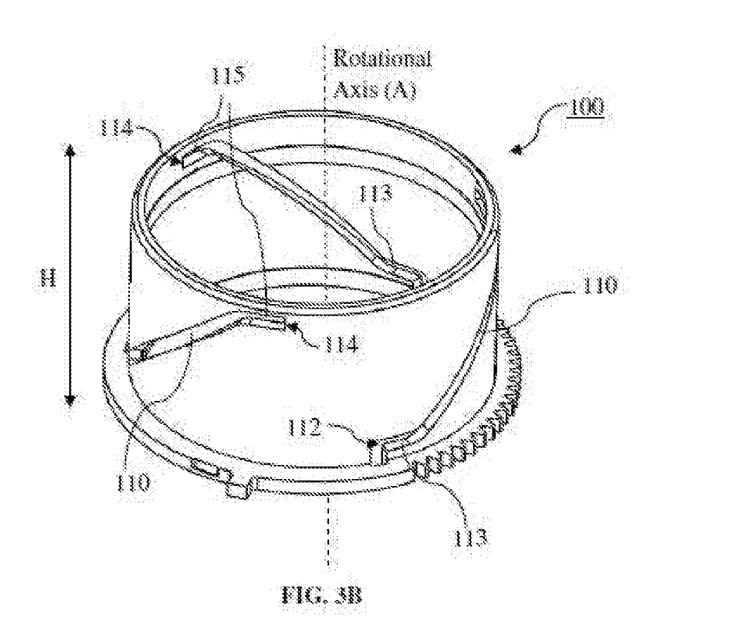

The cam module 100 (also referred to as the cam body 100) surrounds, encircles, or encapsulates the first body 50. The first body 50 can be coupled or mounted to the cam module 100. FIG. 3B shows the cam module 100 according to particular embodiments of the present disclosure.

The cam module 100 is rotatable about a rotational axis, for instance the rotational axis (A) as shown in FIG. 1 and FIG. 3A. The cam module 100 can be coupled to a driver 300 (i.e., driving means or mechanism), for instance a motor or servomotor. The driver 300 is configured to effectuate rotation of the cam module 100. In many embodiments, the cam module 100 is coupled to the driver 300 via a motor rack 130 as shown in FIG. 3D. The motor rack 130 can be attached at or proximal to a base of the cam module 100. In several embodiments, a set of gears 140, for instance helical gear(s) 140a and/or worm gear(s) 140b, can be used to connect the motor rack 130 to the cam module 100. The set of gears 140 are configured and positioned to effectively and/or efficiently translate or transfer a driving force provided via the motor rack 130 into rotation of the cam module 100. In addition, the worm gear(s) 140b can also be used to control rotation of the cam module 100, for instance by preventing, inhibiting, and/or stopping rotation in an un-intended (e.g., reverse) direction. The use of the worm gear(s) 140b can help to ensure rotation occurs in an intended or targeted manner (e.g., direction and/or speed).

In several embodiments, the rotation of the cam module 100, for instance at least one of initiation, termination, and speed of rotation of the cam module 100, can be controlled. In some embodiments, a control module 310 is coupled to the driver 300. The control module 310 is configured to effectuate control of rotation of the cam module 100. The control module 310 can store and execute a set of instructions (e.g., program instructions) for effectuating control of rotation of the cam module 100. For instance, the control module 310 can store and execute instructions for controlling, determining, and/or adjusting speed of rotation of the cam module 100. In addition, in particular embodiments, the control module 310 can also store and execute instructions for controlling initiation, termination, and/or direction (e.g., clockwise or anticlockwise) of rotation of the cam module 100.

The cam module 100 defines, includes, or carries a set of pathways, recesses, or paths 110 (also collectively referable to as a pathway 110). The set of pathways 110 of the cam module 100 can be defined or formed within or along the walls 120 of the cam module 100. The set of pathways 110 of the cam module 100 is configured to receive, engage or couple to, carry, or support the set of follower elements 60 of the first body 50. The set of follower elements 60 can travel or be displaced along the set of pathways 110 during rotation (i.e., rotational displacement) of the cam module 100.

Where the first body 50 includes multiple follower elements 60, the cam module 100 can also include a corresponding number of individual pathways 110, wherein each pathway 110 receives one follower element 60. The profile of each pathway 110 can be determined, varied, or adjusted as desired. For example, the pathway 110 can have a curved, sloped, slanted, helical, tapered, or irregular profile or pattern along the walls 120 of the cam module 100. Where the cam module 100 includes multiple separate pathways 110, each pathway 110 can have a same, identical, or substantially identical profile.

Each pathway 110 of the cam module 100 can extend a substantial part of the height (H) of the cam module 100, for instance at least approximately 75%, 85%, or even 95% of the height (H) of the cam module 100. As shown in FIG. 3B, each pathway 110 terminates at a first end 112 and a second end 114 located at opposite terminals of the pathway 110. Where the cam module 100 is a cylindrical structure such as that shown in FIG. 3B, the first end 112 can be located proximal to the base of the cam module 100 and the second end 114 can be located proximal to a top of the cam module 100.

In many embodiments, the first end 112 includes a first end portion 113 and the second end 114 includes a second end portion 115. Each of the first end portion 113 and the second end portion 115 can be of a substantially horizontal configuration (i.e., can be positioned or disposed in a direction substantially perpendicular the rotational axis (A). In several embodiments, the first end portion 113 and/or the second end portion 115 are shaped, designed, and/or configured to at least temporarily retain or maintain the position of the follower elements 60 thereat when the cam module 100 is stationary.

The rotation of the cam module 100 facilitates or effectuates displacement of the set of the follower elements 60 along the set of pathways 110. For instance, where the set of follower elements 60 is initially located at the first end 112 of the set of pathways 110, the rotation of the cam module 100 can facilitate or effectuate displacement of the set of follower elements 60 along the set of pathways 110 from the first end 112 to or towards the second end 114.

In several embodiments, the horizontal configuration of the first end portion 113 and the second end portion 115 (i.e., the position or disposition of the first end portion 113 and the second end portion 115 perpendicular to the rotational axis (A)) helps to prevent or inhibit displacement (e.g., unintentional displacement or movement) of the set of follower elements 60 in a direction parallel to the rotational axis (A) when the cam module 100 is stationary.

The horizontally disposed second end portions 115 of the set of pathways 110 can enable the cam module 100 to hold, carry, or support the weight of the first body 50, and in several embodiments the weight of other component(s), module(s), or structure(s) that are coupled to, connected to, or carried by the first body 50. More specifically, the horizontally disposed second end portions 115 of the set of pathways 110 of the cam module 100 can hold, carry, or support the weight of the first body 50, and in several embodiments the weight of other component(s), module(s), or structure(s) that are coupled to, connected to, or carried by the first body 50 via the set of follower elements 60 positioned or retained at said second end portions 115 of the set of pathways 110.

As described above, the cam mechanism 20 or cam assembly 20 of the present disclosure can translate rotary motion of the cam module 100 about the rotational axis (A) into linear motion of the first body 50 parallel the rotational axis (A). The cam mechanism 20 can translate rotary motion of the cam module 100 about the rotational axis (A) into linear displacement of the set of follower elements parallel the rotational axis (A). In most embodiments, said motion translation is facilitated, enabled, controlled, or effectuated by the outer body 150 of the cam mechanism 20.

Aspects of the Outer Body/Guide Body

Figure 3C:
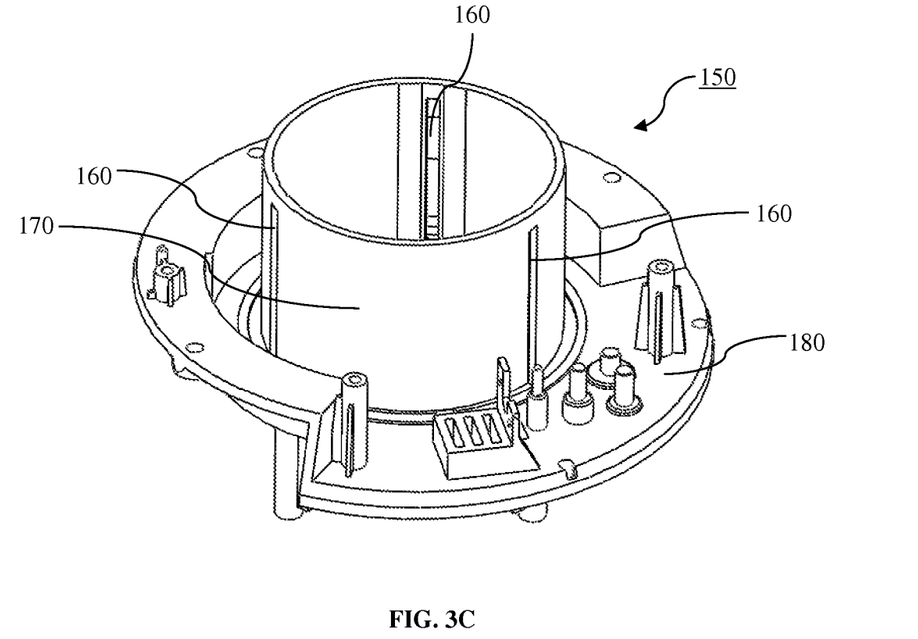
Figure 3D:
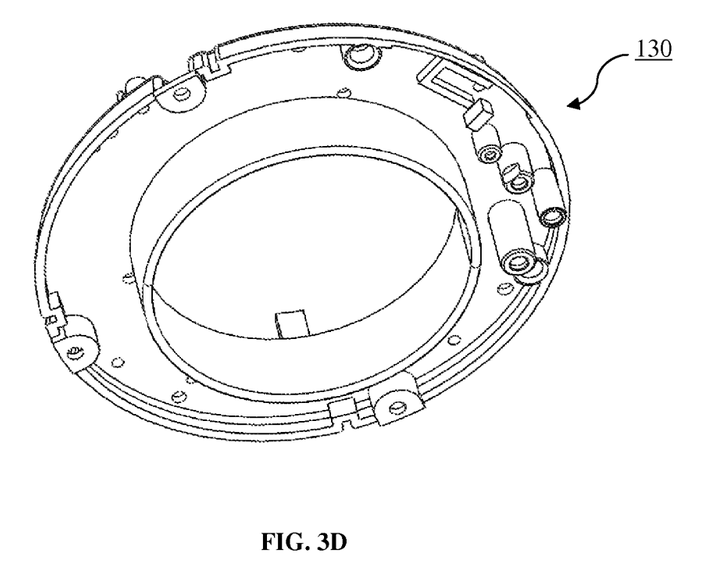

FIG. 3C shows the outer body 150 or guide body 150 according to particular embodiments of the present disclosure. The outer body 150 is shaped and configured to surround, encircle, or encapsulate the cam module 100.

In many embodiments of the present disclosure, the outer body 150 is a stationary or fixed body or structure. Keeping the outer body 150 stationary can facilitate or enable easier, faster, more accurate, and/or more durable mounting or coupling of other components, parts, elements, or devices to the outer body 150. In addition, the stationary outer body 150 can also isolate the movable cam mechanism component parts (e.g., the cam module 100 and first body 50). Accordingly, the cam mechanism 20 of various embodiments enables its movable component parts (e.g., the cam module 100 and the first body 50) to be physically isolated, and in some embodiments protected or shielded, from external factors or conditions. In addition, physical isolation of the movable cam mechanism component parts (e.g., the cam module 100 and the first body 50) by the outer body 150 can help to improve or enhance aesthetic or visual attractiveness of the cam mechanism 20 (or of the device incorporating the cam mechanism 20).

The stationary or spatially fixed nature of the outer body 150 can increase ease and/or convenience at which the outer body 150 is aesthetically defined and/or varied. In particular embodiments, stationary or spatially fixed nature of the outer body 150 of the cam mechanism enhances the operation of the cam mechanism 20 (e.g., reduces power or energy required for movement or rotation of the cam module 100).

In most embodiments, the outer body 150 is configured to guide, control, limit, and/or determine the displacement of the first body 50. More specifically, the outer body 150 cam be configured to guide, control, and/or determine the effective direction of travel or displacement or motion of the set of follower elements 60 of the first body 50, and accordingly the effective direction of travel or displacement of the first body 50.

In many embodiments, the outer body 150 includes or carries a set of guide structures 160 (or follower element guide structures 160). Each guide structure 160 is shaped, dimensioned, and/or configured to receive or couple to, or engage with, at least a portion of one follower element 60 of the first body 50. In various embodiments, each guide structure 160 within the set of guide structures 160 is shaped and/or dimensioned such that one follower element 60 within the set of follower elements 60 is matingly fit or engaged within said guide structure 160.

The number of guide structures 160 of the outer body 150 typically corresponds to the number of follower elements 60 of the first body 50. Accordingly, each follower element 60 within the set of follower elements 60 of the first body 50 can be received within or engaged to one guide structure 160 within the set of guide structures 160 of the outer body 150.

In several embodiments, each guide structure 160 of the set of guide structures 160 is positioned or aligned at least substantially parallel the rotational axis (A). Each guide structure 160 can be configured to confine travel or displacement of the follower element 60 engaged thereto to at least substantially parallel the rotational axis (A). Therefore, the set of guide structures 160 correspondingly guides, controls, limits, or determines the direction of displacement of the first body 50.

Rotation of the cam module 100 about the rotational axis (A) enables travel of the set of follower elements 60 of the first body 50 along the set of pathways 110 of the cam module. As the set of follower elements 60 is engaged with the set of guide structures 160 of the outer body, the effective direction of travel or displacement of the set of follower elements 60 is confined or limited to substantially parallel the rotational axis (A). Therefore the travel of the set of follower elements 60 of the first body 50 along the set of pathways 110 of the cam module 100 during rotation of the cam module 100 linearly displaces the set of follower elements 60 along the at least one guide structure 160 and substantially parallel the rotational axis (A) to thereby displace the first body between a first position and a second position.

The cam mechanism or assembly 20 facilitates or enables translation of the rotary motion or torque of the cam module 100 about the rotational axis (A) (and displacement of the set of follower elements 60 along the set of pathways 110) into linear motion of the set of follower elements 60, and hence the first body 50, in a parallel manner along the rotational axis (A).

In several embodiments, the outer body or guide body 150 includes a body portion 170 and a flange portion 180. FIG. 3C shows the guide module 150 including a central cylindrical body portion 170 and an outwardly projecting flange portion 180 that extends or projects from the outer circumference of the body portion 170 in a substantially perpendicular direction.

As shown in FIG. 3C, the guide structures 160 can be formed at, along, or within the body portion 170 of guide module 150. The guide structures 160 can be configured and/or positioned to allow easy, unrestricted, and/or unobstructed access of the follower elements 60 to the guide structures 160. For instance, the set of guide structures 160 can be formed along the inner walls or inner circumference of the body portion 170 to facilitate engagement of the set of follower elements 60 of the first body 50 to the set of guide structures 160.

In several embodiments, the flange portion 180 is configured to carry or couple to a printed circuit board 190. The flange portion 180 can form a ring around the body portion 170 and can be of a circular shape. Accordingly, the printed circuit board 190 can have a circular ring or disk-like shape to couple or fit onto the flange portion 180.

As previously disclosed, the outer body 150 can be a stationary body or structure. The stationary or positionally-fixed nature of the outer body 150 enables easier, faster, more accurate, and/or more durable coupling of the printed circuit body 190 to the outer body 150. In some embodiments, the flange portion 180 can be configured to carry or couple to gears 140, for example helical gears 140*a* and worm gears 140*b*. The stationary nature of the flange portion 180 can enable easier, faster, more accurate, and/or more durable mounting or coupling of the gears 140, for example the helical gears 140*a* and worm gears 140*b*, thereto.

The assembling or coupling of the first body 50 (or inner body 50), the cam module 100, and the outer body 150 (or outer body 150 or outer body 150) results in the construction or assembly of the cam mechanism or assembly 20. The first body 50 is coupled or mounted to each of the cam module 100 (via receipt or engagement of the set of follower elements 60 within the set of pathways 110 of the cam module 100) and the guide module 150 (via engagement of the set of follower elements 60 to the set of guide structures 160 of the guide module 150.

As described above, the rotation of the cam module 100 about the rotational axis (A) enables travel of the set of follower elements 60 of the first body 50 along the set of pathways 110 of the cam module 100. The set of guide structures 160 to which the set of follower elements 60 is engaged is configured to confine or limit displacement of the set of follower elements 60 in a direction substantially parallel the rotational axis (A). This linear displacement of the set of follower elements 60 along the set of guide structures 160 in a direction substantially parallel the rotational axis (A) effectuates corresponding linear displacement of the first body 50 substantially parallel the rotational axis (A).

The cam mechanism or assembly 20 enables smooth, effective, and/or simple translation of rotary torque of the cam module 100 into linear motion, for example a vertical or up/down motion, of the first body 50. This motion of the first body 50 can be associated with a low mechanism noise and/or vibration level. Furthermore, the cam mechanism 20 can be of a compact design. Assembly of the various components (e.g., the first body 50, the cam module 100, and the guide module 150) of the cam mechanism 20 is simple and cost-effective.

In addition, the cam mechanism 20 can be configured to have or provide variable load capacities. When applied to a mechanical device, for instance a speaker device, apparatus, or mechanism, the cam mechanism 20 can be configured or constructed to carry the weight of at least a portion of the mechanical device, and preferably the weight of a substantial portion of the mechanical device. For instance, the mechanical device can be coupled or connected to, or can be a part of, the first body 50 of the cam mechanism 20, wherein at least particular portions or sections of the cam module 100 (e.g., the second portions 115 of the set of pathways 110 of the cam module 100) is configured to hold, carry, or support the weight of at least a portion of the mechanical device, and preferably the weight of a substantial portion of the mechanical device.

The cam mechanism 20 can also be compact, light-weight, and/or water resistant. Different materials known in the art can be used for constructing the cam mechanism 20. In particular embodiments, the cam mechanism 20 can include an auto-locking feature (not shown), module, or element configured to maintain the relative position of the components (e.g., first body 50, cam module 100, and outer body 150) of the cam mechanism 20 when power for driving the cam module 100 is unexpectedly or undesirably cut off. The auto-locking feature can include a worm gear 140b. Said auto-locking feature can be coupled to the cam mechanism 20, more specifically to the control module 310 and/or driver 300 of the cam mechanism 20.

Aspects of Particular Process Embodiments

Figure 4:
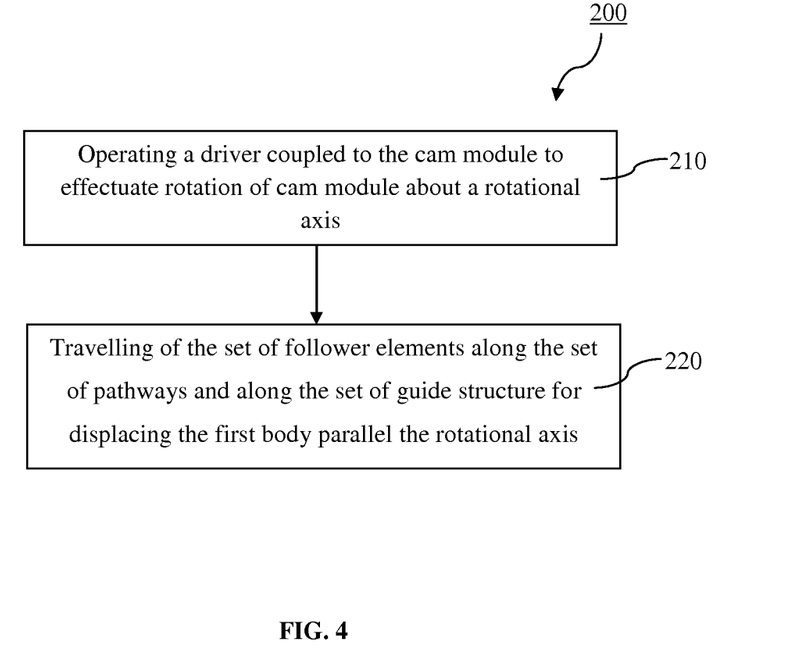
FIG. 4 is a flowchart of a process for transforming rotary motion into linear motion in accordance with an embodiment of the present disclosure.

FIG. 4 shows a flowchart of a process 200 for translating, changing, or transforming rotary motion (or rotary torque) into linear motion according to particular embodiments of the present disclosure. The process 200 is performed, realized, or effectuated using the cam mechanism or assembly 20 as described above.

The cam mechanism 20 includes the first body 50 (or inner body 50), the cam module 100, and the outer body 150 (or guide body 150). The cam mechanism 20 can be incorporated into, applied to, or used with different devices, apparatuses, and/or systems to translate a rotary motion (or rotary torque) of one body, component, element, or module into linear motion of another body, component, element, or module in a simple, quick, effective, and/or cost-efficient manner. The outer body 150 of the cam mechanism 20 surrounds, encircles, or encapsulates each of the cam module 100 and the first body 50. In several embodiments, the outer body 150 is a stationary structure that is configured to physically isolate movable cam mechanism component parts (e.g., the cam module 100 and the first body 50).

A first process portion 210 involves operating a driver 300 for driving rotation of the cam module 100. The rotation of the cam module 100, for instance at least one of initiation, termination, and speed of rotation of the cam module 100, can be controlled by the control module 310. The control module 310 is coupled to the driver 300, and can be configured to execute a set of instructions in order to control the rotation of the cam module 100. For instance, the control module 310 can be configured to effectuate a precise speed of rotation of the cam module for a precisely timed displacement of the set of follower elements 60 from the first end 112 to the second end 114 of the set of pathways 110.

Rotation of the cam module 100 effectuates or enables travel of the set of follower elements 60 of the first body 50 along the set of pathways 110 in a second process portion 220. The set of follower elements 60 is engaged to the set of guide structures 160 of the outer body 150. Travel of the set of follower elements 60 along the set of pathways 110 between the first end 112 and the second end 114 linearly displaces the set of follower elements 60 along the set of guide structures and parallel the rotational axis (A) to thereby displace the first body 50 between the first position and the second position respectively.

In several embodiments, the first position of the first body 50 corresponds to a first height (or first elevation) of the first body 50 from a reference surface (e.g., a surface carrying the cam mechanism 20); and the second position corresponds to a second height (or second elevation) of the first body 50 from said reference surface. The second height can be above (i.e., higher than or larger than) the first height relative the reference surface. Therefore, the displacement of the set of follower elements 60 along the pathway 110 from the first end 112 to or towards the second end 114 effectuates the displacement of the first body 50 from the first position to or towards the second position, which corresponds to the displacement or elevation of the first body 50 from the first height to or towards the second height relative to the reference surface.

As described above, the set of pathways 110 includes the first end portion 113 and the second end position 115, each of which is positioned or disposed perpendicular the rotational axis (A). The perpendicular disposition of the first end portion 113 and the second end portion 115 relative to the rotational axis (A) helps prevent displacement of the set of follower elements 60, and hence first body 50, in a direction parallel the rotational axis (A) without cam module rotation when the set of follower elements 60 is positioned at the first end portion 113 and the second end portion 115. Therefore, the perpendicular configuration of the first end portion 113 and second end portion 115 can aid positional locking or maintenance of the first body 50 at the first position and the second position respectively.

In some embodiments, the use of worm gears 140b helps to prevent unintentional or undesired movement of the set of follower elements 60, for instance unintentional movement of the set of follower elements 60 towards one of the first end 112 and the second end 114 of the set of pathways 110. The use of worm gears 140*b* helps to control rotation of the cam module 100. For instance, the worm gears 140*b* can help prevent rotation of the cam module 100 in an unintended direction.

In several embodiments, the configuration of the second end portions 115 of the set of pathways 110 (e.g., the disposition of the second end portions 115 of the set of pathways 110 perpendicular to the rotational axis (A)) enables the cam module 100, and more specifically the second end portions 115 of the set of pathways to hold, carry, or support at least a portion of the weight of the first body 50 when the set of follower elements 60 of the first body 50 is positioned at the second end portions 115 of the set of pathways 110.

The process 200 for translating, changing, or transforming rotary motion (or rotary torque) into linear motion of various embodiments is simple and effective. The configuration of the cam mechanism 20 (e.g., the encapsulation or encircling of the first body 50 and the cam module 100 by the guide module 150) allows a user to observe smooth vertical displacement (e.g., projection and/or retraction) of the first body 50, which can be aesthetically attractive. The position of the cam module 100 between the first body 50 and the outer body 150 can facilitate or enable smooth, accurate, effective, and/or precise translation of rotary torque of the cam module 100 to linear motion or displacement of the first body 50.

Example One

Application of a Cam Mechanism to a Speaker Mechanism

The cam mechanism of particular embodiments can be incorporated into an existing speaker mechanism or device, or to new speaker mechanisms or devices.

The speaker mechanism of example one include a number of main components, namely a sound component, a lighting component, the cam mechanism, and a housing component. The housing component houses, surrounds, or encapsulates each of the sound component and the cam mechanism. The sound component is configured to produce, emit, and/or project sound or sound waves. The sound component can be positioned a base of the speaker mechanism.

The cam mechanism is coupled to the sound component. More specifically, the cam mechanism can be mounted onto, or above, the sound component. The lighting component can be mounted onto the cam mechanism. In the speaker mechanism of example one, the lighting component can be carried by the first body of the cam mechanism. The housing component of the speaker mechanism can include a lid or cover that forms a top surface of the speaker mechanism.

As described above, rotation of the cam module of the cam mechanism about a rotational axis is translated into linear motion or displacement of the first body along the rotational axis. More specifically, the rotary motion of the cam module effectuates vertical displacement of the first body along the rotational axis. The vertical displacement of the first body upwards correspondingly displaces the light component vertically upwards. Speed of vertical displacement of the light component is determined by the speed of displacement of the first body. The speed of vertical displacement of the first body, and hence the light component, is controllable, and can be adjusted as desired by the user. The vertical displacement of the first body also effectuates corresponding vertical displacement of the lid of the speaker mechanism, thereby giving a outward appearance of increasing height of the speaker mechanism. The light component is at least partially visible to a user. This controlled, precise, and/or smooth vertically displacement of the light component and the lid of the speaker mechanism can be aesthetically attractive.

As described above, the first body of the cam mechanism can be a cylindrical structure that defines a hollow interior or space. Sound or sound waves emitted by the sound component travel within the hollow interior of the first body before being transmitted from the speaker mechanism through openings or vents located at a top portion of the speaker mechanism. By displacing the first body vertically upwards parallel to the rotational axis, this hollow interior or space can be extended or expanded upwards (i.e., in an upward direction). In other words, the vertical displacement of the first body in an upward direction parallel the rotational axis increases the space or hollow volume within the speaker mechanism. This increase in the space within the speaker mechanism can enhance the sound emitted from speaker mechanism. For instance, the increase in space through which sound waves have to travel before being emitted from the speaker mechanism can help to enhance the quality of sound emitted from the speaker mechanism.

The outer body of the cam mechanism is stationary. The stationary nature of the outer body of the cam mechanism facilitates easier, faster, more accurate, and/or more durable mounting or coupling of components, parts, or elements, for example actuators, gears, and/or control circuitry, to the outer body. The outer body encircles each of the cam module and the first body to enable physical isolation of movable cam mechanism component parts (e.g., the cam module and the first body). The outer body, cam module, and first body can be concentrically aligned.

The weight of the first body together with the components or structures coupled thereto or carried thereby (e.g., the lighting component) can be supported or carried by the cam module. For instance, the cam module can be configured to support at least a portion of the weight of the first body together with the components or structures coupled thereto or carried thereby (e.g., the lighting component) for facilitating and/or effectuating vertical displacement of the first body parallel the rotational axis. In addition, particular portions of the set of pathways of the cam module (e.g., the second end portions of the set of pathways) can be configured and/or disposed in a manner to facilitate and/or effectuate the support or carrying of at least part of the weight of the first body, and more preferably a substantial part of the weight of the first body and the components (e.g., lighting component) carried by the first body, by the cam module.

Although an embodiment of the present disclosure involving the incorporation of the cam mechanism into a speaker mechanism is described above, it will be understood that the cam mechanism can be incorporated, used with, or applied to many other mechanical devices for providing other functional uses and/or advantages within the scope of the present disclosure.

Embodiments of the present disclosure relate to cam mechanisms, apparatuses, systems, devices, and/or structures, for transforming rotary motion or torque of one element, module, component, or body (e.g., the cam module) into linear motion of another element, module, component, or body (e.g., the first body). Methods, processes, and/or techniques for transforming rotary motion of one element, module, component, or body (e.g., the cam module) into linear motion of another element, module, component, or body (e.g., the first body) by using, applying, or incorporating the cam mechanism of the present disclosure are also provided by the present disclosure. The cam mechanism includes the first body; the cam module that surrounds, encircles, or encapsulates the first body; and the guide body that surrounds, encircles, or encapsulates the cam module and the first body. The outer body, cam module, and first body can be concentrically aligned, for instance about a rotational axis.

The first body includes the set of follower elements. The outer body includes the set of guide structures configured to engage with the set of follower elements and confine travel of the set of follower elements to substantially parallel the rotational axis. The cam module includes a set of pathways defining a set of pathways along which the set of follower elements can travel. Rotation of the cam module enables travel of the set of follower elements along the set of pathways of the cam module. Travel of the set of follower elements along the set of pathways of the cam module effectuates linear displacement of the set of follower elements along the set of guide structures and parallel the rotational axis to thereby displace the first body between the first position and the second position.

The cam mechanism provides for smooth, effective, and accurate translation of rotary motion or torque of the cam module into linear motion or displacement of the first module. Speed of rotation of the cam module about the rotational axis can be controlled, thereby enabling control of speed of linear motion of the first module along the rotational axis. The cam mechanism can be compact and can be designed to have a low mechanism noise and/or vibration level. In addition, the cam mechanism can include an auto-locking (i.e., position maintenance) feature or module that facilitates or effectuates maintenance of the relative positions of the cam mechanism's component parts (e.g., the relative positions of the first body, the cam module, and the guide body) during an unexpected and/or undesired halt to driving force being provided to the cam module.

Particular embodiments of the disclosure are described above. While features, functions, advantages, and alternatives associated with certain embodiments have been described within the context of those embodiments, other embodiments may also exhibit such advantages, and not all embodiments need necessarily exhibit such advantages to fall within the scope of the disclosure. It will be appreciated that several of the above-disclosed mechanisms, structures, features and functions, or alternatives thereof, may be desirably combined into different devices, systems, or applications. The above-disclosed structures, features and functions, or alternatives thereof, as well as various presently unforeseen or unanticipated alternatives, modifications, variations or improvements thereto that may be subsequently made by one of ordinary skill in the art, are encompassed by the following claims.

The invention claimed is:

1. An assembly comprising:
a cam mechanism comprising
a first body comprising at least one follower element;
an outer body defining an axis and comprising at least one guide structure configured to engage with the at least one follower element for confining travel thereof to at least substantially parallel to the axis and guiding the first body between a first position and a second position;
a cam module positioned between the first body and the outer body, the cam module configured with the outer body for rotational displacement at least substantially about the axis, the cam module defining at least one pathway having a profile, the at least one pathway being shaped and dimensioned for the at least one follower element to travel along the respective at least one pathway during rotational displacement of the cam module about the axis,
wherein travel of the at least one follower element along the at least one pathway during rotational displacement of the cam module linearly displaces the at least one follower element along the at least one guide structure and parallel the axis to thereby displace the first body between the first position and the second position;
a driver coupled to the cam module, the driver operable to effectuate rotation of the cam module about the axis;
a control module coupled to the driver, the control module configured to control operation of the driver; and
an auto-locking feature coupled to the control module, the auto-locking feature configured to maintain a relative position of each of the first body, the cam module, and the outer body;
wherein the auto-locking feature comprises a worm gear configured to control rotation of the cam module;
wherein a hollow space within the cam mechanism increases when the first body is displaced from the first position to the second position;
a sound component coupled to the cam mechanism, the sound component configured to emit sound from within the hollow space.

2. The assembly as in claim 1, wherein the outer body is configured to encircle the cam module and the first body.

3. The assembly as in claim 2, wherein the first body, the cam module, and the outer body are concentrically aligned.

4. The assembly as in claim 2, wherein each of the first body, the cam module, and the outer body is cylindrical in shape, and wherein a diameter of the first body is smaller than a diameter of the cam module, and the diameter of the cam module is smaller than a diameter of the outer body.

5. The assembly as in claim 2, wherein the outer body is a stationary structure.

6. The assembly as claim 5, wherein the outer body comprises:
a body portion shaped and dimensioned to encircle each of the cam module and the first body, the outer body carrying the at least one guide structure; and
a flange portion extending at least substantially perpendicularly from an outer circumference of the body portion.

7. The assembly as in claim 6, wherein the flange portion is configured to either carry or be coupled to a printed circuit board.

8. The assembly as in claim 6, wherein the at least one guide structure is formed along an inner circumference of the body portion proximate to the cam module, and wherein the at least one guide structure is shaped and dimensioned such that at least a portion of the at least one follower element matingly engages with the at least one guide structure.

9. The assembly as in claim 1, wherein the control module is configured to execute a set of instructions for controlling operation of the driver for effectuating rotation of the cam module about the axis.

10. The assembly as in claim 9, wherein the control module is configured to control a speed of rotation of the cam module and thereby control a speed of displacement of the at least one follower element along the at least one pathway.

11. The assembly as in claim 10, wherein the auto-locking feature is configured to one of facilitate and effectuate maintenance of the relative position of each of the first body, the cam module, and the outer body.

12. The assembly as in claim 10, wherein the profile of the at least one pathway of the cam module comprises a first end and a second end located at opposite terminals of the at least one pathway, the position of the at least one follower element at the first end and the second end of the cam module corresponds to the position of the first body at the first position and the second position respectively.

13. The assembly as in claim 12, wherein the at least one pathway includes an end portion proximal to the second end, the end portion disposed at least substantially perpendicular to the axis.

14. The assembly as in claim 13, wherein a position of the at least one follower element at the end portion of the at least one pathway corresponds to the position of the first body at the second position, and wherein the disposition of the end portion at least substantially perpendicular to the axis prevents displacement of the first body towards the first position.

15. The assembly as in claim 13, wherein the position of the end portion at least substantially perpendicular to the axis enables the cam module to carry at least part of the weight of the first body.

16. A method for translating rotary torque into linear motion comprising:
   operating a driver coupled to a cam module of a cam assembly to rotate the cam module about an axis, the cam module defining at least one pathway having a profile, the at least one pathway shaped and dimensioned for allowing travel of at least one follower element of a first body of the cam assembly therealong during rotation of the cam module about the axis, the cam assembly further comprising an outer body encircling each of the cam module and the first body, the outer body comprising at least one guide structure configured to engage with the at least one follower element for confining travel thereof to at least substantially parallel to the axis and guiding the first body between a first position and a second position;
   linearly displacing the at least one follower element along the at least one guide structure during rotation of the cam module about the axis to thereby displace the first body between the first position and the second position;
   controlling operation of the driver using a control module coupled to the driver; and
   providing an auto-locking feature coupled to the control module, the auto-locking feature configured to maintain a relative position of each of the first body, the cam module, and the outer body;
   wherein the auto-locking feature comprises a worm gear configured to control rotation of the cam module;
   increasing a hollow space within the cam assembly by displacing the first body from the first position to the second position;
   coupling a sound component to the cam assembly, the sound component configured to emit sound from within the hollow space.

17. The method as in claim 16, wherein the outer body is a stationary structure.

18. The method as in claim 16, wherein the first body, the cam module, and the outer body are concentrically aligned.

19. The method as in claim 16, further comprising controlling at least one of initiation, termination, and speed of rotation of the cam module about the axis.

20. The method as in claim 19, wherein the control of the at least one of initiation, termination, and speed of rotation of the cam module is effectuated by the control module coupled to the driver, the control module configured to execute a set of instructions for controlling the at least one of initiation, termination, and speed of rotation of the cam module.

21. The method as in claim 20, further comprising effectuating maintenance of the relative position of each of the first body, the cam module, and the outer body using the auto-locking feature that is coupled to the control module.

22. The method as in claim 16, wherein the profile of the at least one pathway of the cam module comprises a first end and a second end located at opposite terminals of the at least one pathway, wherein the profile of the at least one pathway of the cam module comprises an end portion proximal to the second end, the end portion disposed at least substantially perpendicular to the axis.

23. The method as in claim 22, wherein a position of the at least one follower element at the end portion of the at least one pathway corresponds to the position of the first body at the second position, and wherein the disposition of the end portion at least substantially perpendicular to the axis one of facilitates and effectuates prevention of linear displacement of the first body parallel the axis.

24. The method as in claim 22, further comprising supporting at least part of the weight of the first body by the cam module at the end portion of the least one pathway of the cam module.

25. A speaker mechanism comprising:
   a cam mechanism comprising
      a first body comprising at least one follower element;
      an outer body defining an axis and comprising at least one guide structure configured to engage with the at least one follower element for confining travel thereof to at least substantially parallel to the axis and guiding the first body between a first position and a second position;
      a cam module positioned between the first body and the outer body, the cam module configured with the outer body for rotational displacement at least substantially about the axis, the cam module defining at least one pathway having a profile, the at least one pathway being shaped and dimensioned for the at least one follower element to travel along the respective at least one pathway during rotational displacement of the cam module about the axis,
      wherein travel of the at least one follower element along the at least one pathway during rotational displacement of the cam module linearly displaces the at least one follower element along the at least one guide structure and parallel the axis to thereby displace the first body between the first position and the second position; and
      wherein a hollow space within the speaker mechanism increases when the first body is displaced from the first position to the second position;
   and
   a sound component coupled to the cam mechanism, the sound component configured to emit sound from within the hollow space.

26. The speaker mechanism of claim 25, further comprising:
   a lighting component carried by the first body,
   wherein the cam mechanism is configured to vary a vertical displacement of the lighting component.

* * * * *